United States Patent
Kono

(10) Patent No.: US 8,678,396 B2
(45) Date of Patent: *Mar. 25, 2014

(54) LEAF SEAL DEVICE

(75) Inventor: Toru Kono, Tokyo (JP)

(73) Assignee: Eagle Industry Co., Ltd., Tokyo (JP), ( * ) Notice: Subject to any disclaimer, the term of this patent is extended or adjusted under 35 U.S.C. 154(b) by 0 days.

This patent is subject to a terminal disclaimer.

(21) Appl. No.: 13/365,683

(22) Filed: Feb. 3, 2012

(65) Prior Publication Data

US 2012/0200044 A1  Aug. 9, 2012

Related U.S. Application Data

(62) Division of application No. 12/532,541, filed as application No. PCT/JP2009/052158 on Feb. 9, 2009.

(30) Foreign Application Priority Data

Mar. 10, 2008 (JP) ................................ 2008-059596

(51) Int. Cl.
*F01D 11/02* (2006.01)

(52) U.S. Cl.
USPC ........................................................ 277/355

(58) Field of Classification Search
USPC ........................................................ 277/355
See application file for complete search history.

(56) References Cited

U.S. PATENT DOCUMENTS

| 6,267,381 | B1 | 7/2001 | Wright |
| 6,343,792 | B1 | 2/2002 | Shinohara et al. |
| 6,648,334 | B2 | 11/2003 | Inoue |
| 6,874,788 | B2 | 4/2005 | Kono |
| 7,201,378 | B2 | 4/2007 | Kono |
| 8,272,644 | B1 * | 9/2012 | Aho et al. ............. 277/355 |
| 2003/0094764 | A1 | 5/2003 | Crudgington |
| 2003/0174918 | A1 | 9/2003 | Suh et al. |
| 2004/0232621 | A1 | 11/2004 | Kono |
| 2008/0007009 | A1 * | 1/2008 | Williams ................ 277/355 |
| 2008/0169614 | A1 | 7/2008 | Awtar et al. |
| 2009/0322038 | A1 | 12/2009 | Wright |

FOREIGN PATENT DOCUMENTS

| GB | 2 404 702 A | 2/2005 |
| JP | 2002-364755 A | 12/2002 |
| JP | 2003-294153 A | 10/2003 |
| JP | 2004-346957 A | 12/2004 |
| JP | 2005-233020 A | 9/2005 |
| WO | WO00/03164 A1 | 1/2000 |

* cited by examiner

*Primary Examiner* — Vishal Patel
*Assistant Examiner* — Nicholas L Foster
(74) *Attorney, Agent, or Firm* — Arent Fox LLP

(57) ABSTRACT

A leaf seal device having a connection holding section of a sealing plate which is bent at a first bending section. A plurality of laminated sealing plates are engaged sequentially at the first bending section. An inclined face at an inner circumferential side of the connection holding section, a pitch and a space of a sealing section are changed.

1 Claim, 15 Drawing Sheets

LEAF SEAL DEVICE

CROSS-REFERENCE TO RELATED APPLICATION

This is a Divisional Application of U.S. patent application Ser. No. 12/532,541, filed Sep. 22, 2009; which is a National Stage entry of International Application No. PCT/JP2009/052158, having an international filing date of Feb. 9, 2009; which claims priority to Japanese Application No.: 2008-059596, filed Mar. 10, 2008. The disclosures of these prior applications are hereby incorporated herein its entirety by reference.

TECHNICAL FIELD

The present invention relates to a leaf seal device which is applied to, for example, an air craft engine, gas turbine, etc., to seal a gap between two components which is relatively moving around a rotary axis.

BRIEF DESCRIPTION OF RELATED ART

Conventionally, as for a seal device wherein thin plate shape components are multilayered to compose ring shape, for example, it has been known a brush seal device with plate disclosed in Japanese Patent Application Laid Open No. 2003-294153. The plate shape seal device disclosed in Japanese Patent Application Laid Open No. 2003-294153 wherein numbers of sealing plates are laminated along a circumferential direction of an axis to form an annular shape of the whole sealing plates at an outer circumferential side mounting portion, outer circumferential end portions of the respective sealing plates are overwrapped and arranged via a spacer as a space maintaining portion. Also, a sealing section of an inner circumferential side is bent at a boundary with a mounting portion, and it is provided with a predetermined inclining angle to a circumferential face of the axis. By this constitution, the plate brush seal device disclosed in Japanese Patent Application Laid Open No. 2003-294153 performs effective sealing by appropriating a contact surface of a sealing section as well as available to assemble easily by multilayered thin plates.

SUMMARY OF INVENTION

In the meantime, in the seal device of this kind, with respect to a sealing section at an inner circumferential side of each sealing plate, it is preferably provided so as to contact or adjacent with a circumferential face of a rotary axis with an appropriate inclination angle, pitch or gap, etc. to be set in response to various conditions of a device as an installing object, kind of sealed fluid, temperature, etc. However, in the seal device of this conventional kind, an inclination angle and a space of the sealing section are defined as a specific angle or a space in response to their constitution, and it has not reached to a constitution wherein a shape can be set or modified arbitrarily in response to installing object, etc. For example, in the device disclosed in Japanese Patent Application Laid Open No. 2003-294153, a space of the mounting section of each sealing plates are defined by a thickness of the spacer (a space maintaining portion), thus, a configuration of the sealing section such as the inclination angle, a pitch and constitutions thereof are limited to a specific shape, it could not to be set or to be adjusted in response to condition, etc. of the installing subject arbitrarily.

Therefore, in case of seeking to change the installing configuration and a different installing condition, it was necessarily to change a spacer as a space maintaining portion, namely, it was necessity for re-assembling the sealing plate after disassembling the annularly constituted sealing plate, thus, very complicated and tedious operation was required. Moreover, in actually, such disassemble operation, etc. for changing the space is unpractical, and there was a problem for changing the sealing device itself to a different sealing device against slightly changing installing condition. Therefore, various kinds of different sealing devices must be prepared in order to respond the slightly changing installing condition which leads inefficient and to reduce a production efficiency which achieves increasing cost of not only sealing device but also a product using thereof.

The present invention has been made in view of considering such problem and a purpose of the invention is to provide a leaf seal device which is available to be assembled easily and available to set, adjust and control an inclination angle and a space of a sealing section.

In order to solve said problem, a leaf seal device comprises a leaf seal having a plurality of sealing plates of thin plate shape including a connection holding section of an outer circumferential side and a sealing section of an inner circumferential side, the connection holding sections being connected to overlap the sealing plates and to form an annular shape to which a rotary axis available to fit at a center thereof, wherein said respective sealing plates are bent at a boundary between said connection holding section and said sealing section so that said connection holding section and said sealing section are crossed at a predetermined angle, said connection holding section of said respective sealing plates are connected by sequentially overlapping with bending status at a predetermined angle respectively to a circumferential direction and a radial direction of said leaf seal, and said sealing section of said respective sealing plates are provided so as to incline with a predetermined angle to said circumferential direction from said boundary of said connection holding section toward the inner circumferential side.

According to the leaf seal device having such constitution, a leaf seal device which is available to set an inclination angle and a space of a sealing section and to control thereof can be provided.

Preferably, the leaf seal device according to the present invention is characterized by said connection holding section of said respective sealing plates are folded at an edge of the outer circumferential side thereof to form a double overlapping status.

According to the leaf seal device having such constitution, even in case that inclination of a sealing section is large and a sufficient space between the sealing sections is necessary, an appropriate leaf seal device can be provided corresponding thereto.

Also, preferably, in the leaf seal device of the present invention, each of said connection holding sections of said sealing plates is bent at an intermediate portion so that an inner circumferential face and an outer circumferential face thereof are crossed at a predetermined angle, said respective sealing plates are connected as sequentially fitting status at the intermediate portion of said connection holding section.

According to the leaf seal device having such constitution, a plurality of sealing plates may easily be fixed and mounted efficiently by laminating with appropriate positioning relations so that the leaf seal device which is easily assembling can be provided.

Also preferably, the leaf seal device of the present invention is characterized by a bending direction at the boundary between said connection holding section and said sealing section in said respective sealing plates, and a bending direction at the intermediate portion of said connection holding section, where the inner circumferential face and the outer circumferential face are crossed, are the same direction toward a circumferential direction of said leaf seal.

Also preferably, the leaf seal device of the present invention is characterized by a bending direction at the boundary between said connection holding section and said sealing section in said respective sealing plates, and a bending direction at the intermediate portion of said connection holding section, where the inner circumferential face and the outer circumferential face are crossed, are the opposite direction toward a circumferential direction of said leaf seal.

In the leaf seal device having such constitution, the leaf seal device of the present invention can be realized in a desired condition in response to applied status and shape, etc., respectively.

DETAILED DESCRIPTION OF PREFERRED EMBODIMENTS

With respect to a first embodiment of a leaf seal device of the present invention, it will be specified with reference to FIG. 1 to FIG. 5B. In the present embodiment, the present invention will be specified by exemplifying a leaf seal device used for a steam turbine and a gas turbine to seal a sealed fluid such as gas etc., by partitioning between a through hole which is formed at a casing and a rotary axis which passes through the through hole.

Figure 1:
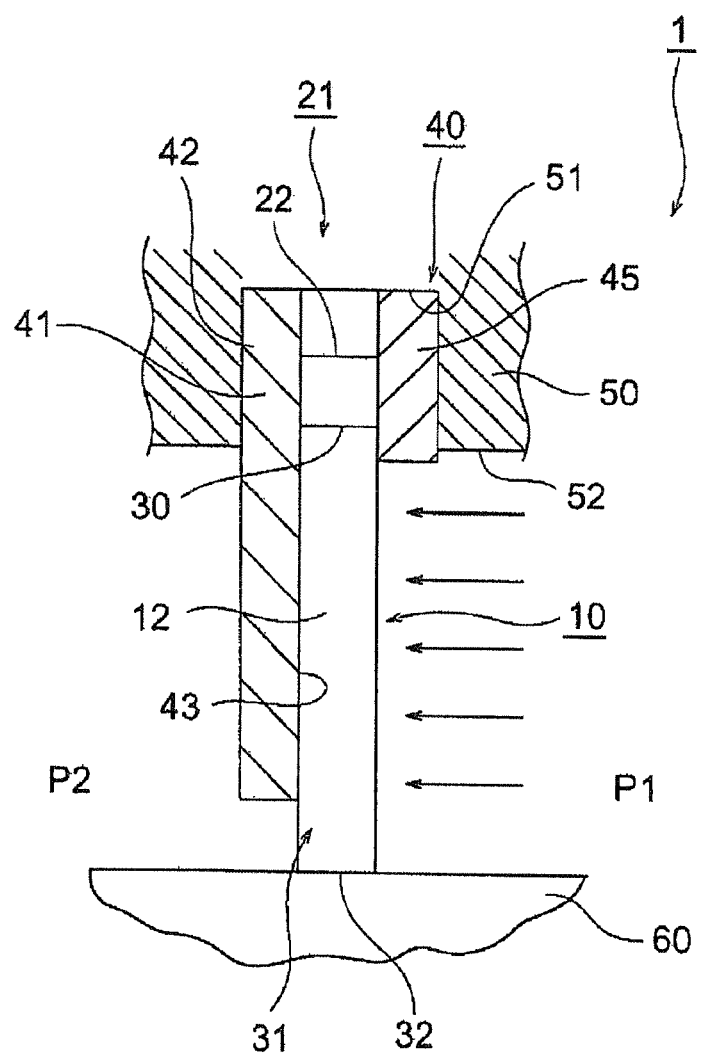
FIG. 1 is a drawing to show whole constitution of one embodiment of a seal leaf device of the present invention.
Figure 2:
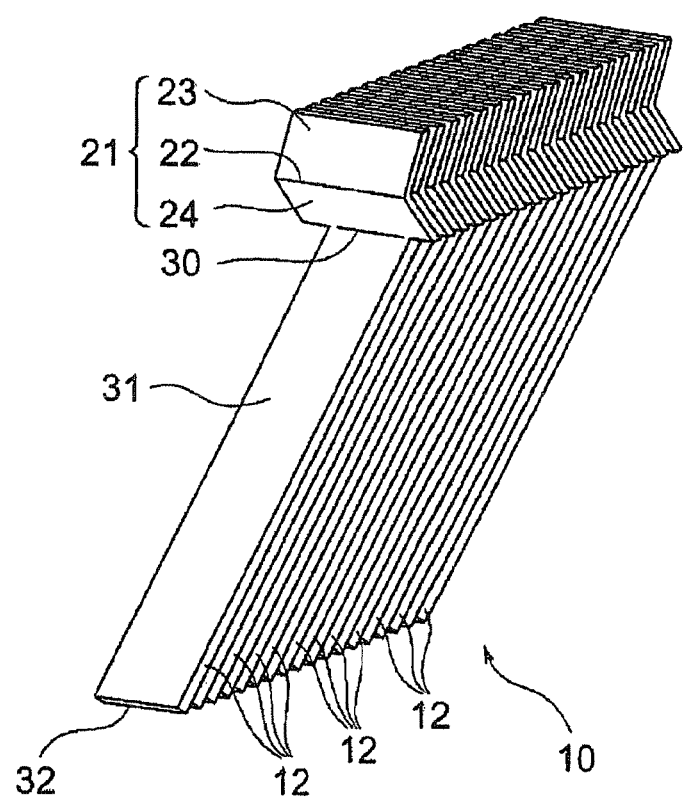
FIG. 2 is a drawing to show a leaf seal of the leaf seal device shown in FIG. 1.
Figure 3:
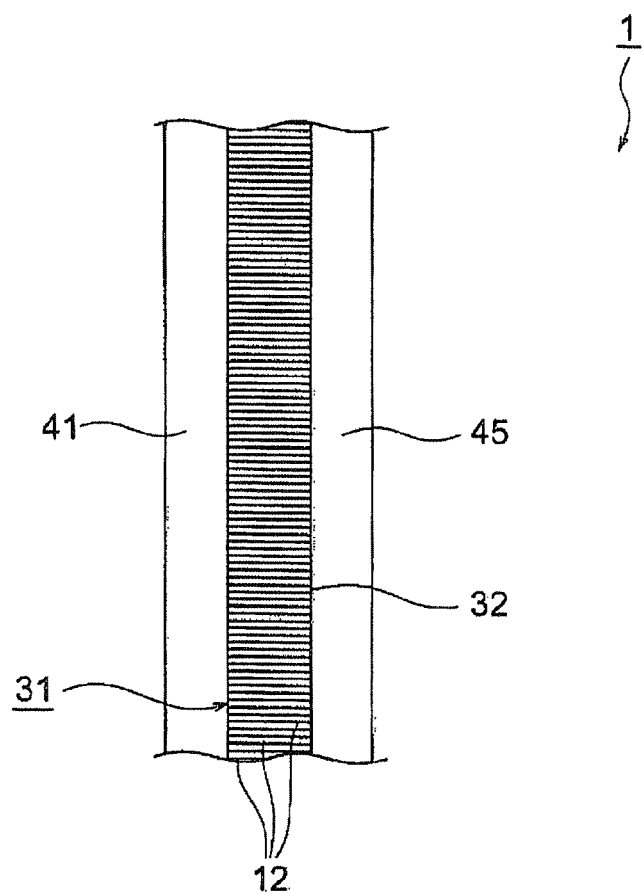
FIG. 3 shows the leaf sealing device shown in FIG. 1 viewing from an inner diameter side.

Firstly, a whole constitution of the leaf seal device will be specified with reference to FIG. 1 to FIG. 3. FIG. 1 is a half cross sectional view showing a whole constitution of the leaf seal device 1. FIG. 2 is a perspective view showing a constitution of a sealing plate 12 of a leaf seal 10 of the leaf seal device shown in FIG. 1. FIG. 3 is a drawing to show the leaf seal device 1 viewing from an inner diameter side. As shown in FIG. 1, the leaf seal device 1 is formed as a ring shape entirely, and is equipped to a groove 51 which is formed on an inner circumferential face 52 of a through hole of a casing 50 to which a rotary axis 60 passes through, to seal a high pressure side P1 and a low pressure side P2 at a space between the casing 50 and the rotary axis.

The leaf seal device 1 comprises the leaf seal 10, a back plate 41 and a holding plate 45. The leaf seal 10 is formed as a ring shape entirely by overwrapping a plurality of (large number of) sealing plates 12 as shown in FIG. 2 and is equipped along a circumferential direction of the rotary axis 60.

The respective sealing plates 12 are composed of a connection holding section 21 and a sealing section 31. The connection holding section 21 is a position for mutually connecting a plurality of the sealing plates 12, and to compose a fixing portion 40 of the leaf seal device 1 by integrated with the back plate 41 and a fixing portion 42 (refer to FIG. 1). Also, in the leaf seal device 1 of the present embodiment, the connection holding section 21 has functions and effects to make a desired vale of pitch and space of sealing section 31, as mentioned later. The sealing section 31 extends from the connection holding section 21 to the rotary axis 60 direction, a free end 32 thereof is arranged as it is contacted with or is adjacent to an outer circumferential face of the rotary axis 60 as shown in FIG. 3. Thereby, the sealing portion 31 seals a space between the casing 50 and the rotary axis in an axial direction.

The respective sealing plates 12 are, as shown in FIG. 1 and FIG. 2, formed by bending with predetermined angle at a first bending section 22 in an intermediate portion of the connection holding section 21 and a second bending section at a boundary between the connection holding section 21 and the sealing section 31, for example, by pressing. The characteristic of the present invention is a shape of the sealing plate 12 like this, namely, it exists in a constitution of the connection holding section 21 having the first bending section 22, a bending section 30 and the sealing section 31 which will be specified later, precisely.

As shown in FIG. 1, the back plate 41 is a ring shape member arranged for supporting the leaf seal 10 at the lower pressure side P2 of the leaf seal 10, namely, an opposite side to which sealed fluid acts to the leaf seal 10. The back plate 10 comprises a fixing portion 42 to support the communication holding section 21 of the leaf seal 10 and a supporting face 43 to support so that the leaf seal 10 is not bent extremely when a pressure of the sealed fluid acts to. The back plate 10 supports the leaf seal 10 by the supporting face 43 to eliminate deformation of the leaf seal when it receives the pressure of the sealed fluid.

The holding plate 45 is a ring shape member provided at the high pressure side P1, namely, at a face side where the sealed fluid of the leaf seal acts, to sandwich the leaf seal 10 with the back plate 41. In the present embodiment, the holding plate 45 is formed that a width of an annular portion thereof is smaller with respect to that of an annular portion of the back plate 41 so as to correspond to a range of where the connection holding section 21 of the sealing plate 12 is equipped. The holding plate supports the leaf seal 10 by cooperating with the back plat 41. Note that, the width of the annular portion of the holding plat 45 may be formed as close to the width of the annular portion of the back plate 41.

Fixing portions 42 of the back plate 41, the communication holding section 21 of the leaf seal and the holding plate 45 are integrally associated by welding, etc., to form the fixing portion 40 of the leaf seal device entirely. The leaf seal device 1 is, as mentioned above, equipped to a casing 50 by that the fixing portion 40 is fixed to a groove 51, etc. provided on an inner circumferential face 52 of a through hole of the casing. A free end portion 31 of the sealing section 31 of the leaf seal 10 is arranged by fitting as contacting or closing condition with an outer circumferential face of a rotary axis 60.

With respect to material for the sealing plate 12, the back plate 41 and the holding plate 45, although it may be selected arbitrarily by considering nature, temperature or other condition of the sealed fluid, it is generally and preferably formed by a steel plate, a stainless steel plate, a nickel alloy plate, a cobalt alloy plate, an aluminum plate or other nonferrous metal and the like. These materials are preferably selected to meet with a coefficient of linear expansion of the casing.

Figure 4:
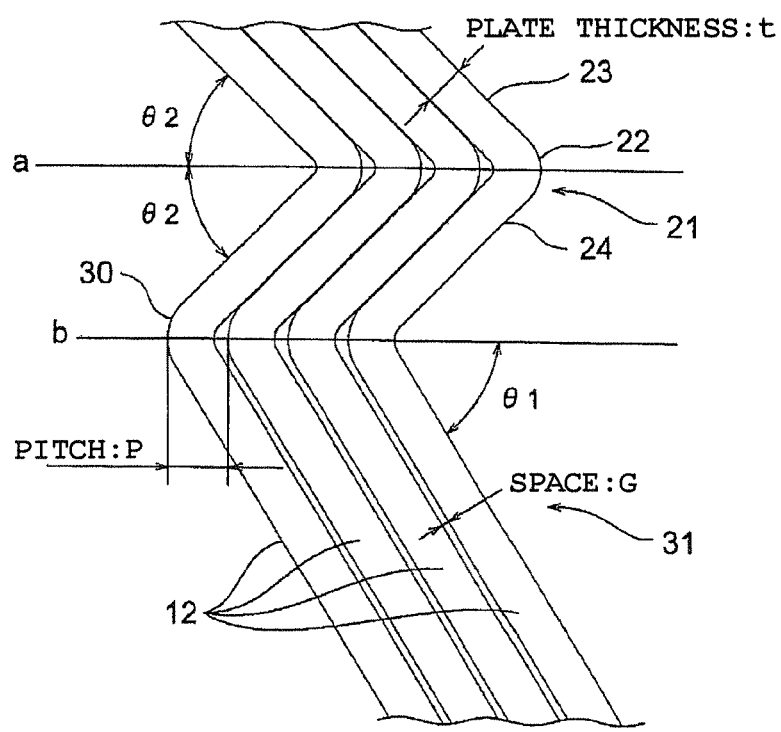
FIG. 4 is an enlarged drawing of vicinity of a first bending section and a second bending section of a sealing plate shown in FIG. 2.
Figure 5A:
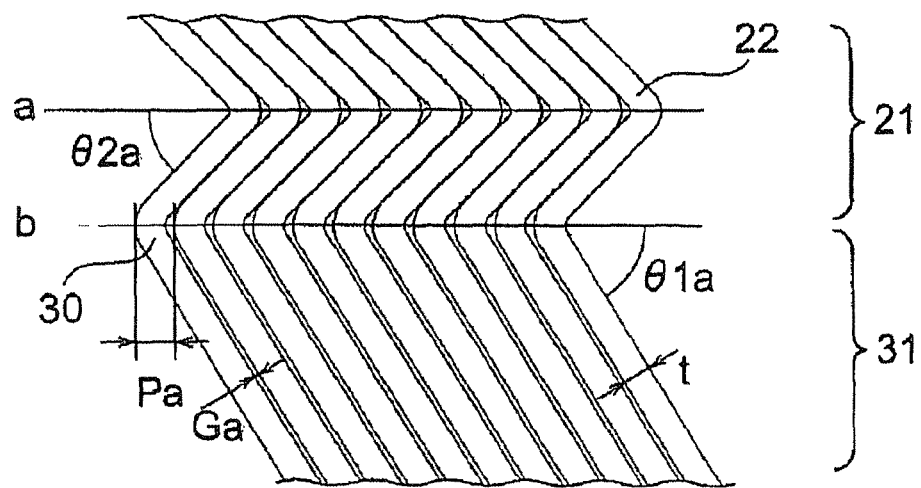
FIG. 5A shows a changing condition of a pitch and a space of the sealing section in response to a bend angle of the first bending section in the leaf seal device shown in FIG. 2, in case of the binding angle of the first bending section is relatively large.
Figure 5B:
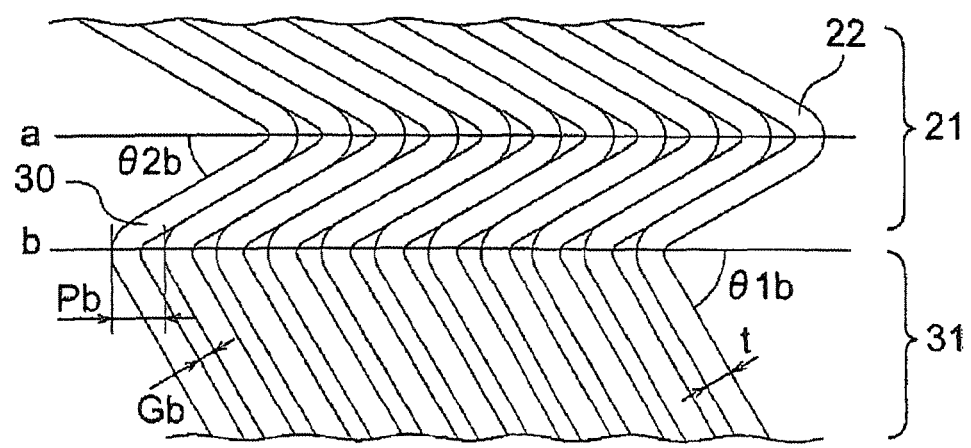
FIG. 5B shows a changing condition of the pitch and the space of the sealing section in response to a bend angle of the first bending section in the leaf seal device shown in FIG. 2, in case of the bend angle of the first bending section is relatively small.

Next, a constitution of the respective sealing plate 12 to constitute the leaf seal 10 and a method for forming the leaf seal 10 by laminating the sealing plates 12 will be specified with reference to FIG. 4, FIG. 5A and FIG. 5B further.

FIG. 4 is an enlarge view of a vicinity of a first folding portion 22 and a second folding portion 30 of the sealing plate 12 of the leaf seal 10 shown in FIG. 2.

As mention above, the respective leaf seals 12 of the leaf seal 10 comprise the connection holding section 21 located at an outer circumferential side and the sealing section 31 arranged by fitting as contacting or closing with an inner circumferential face of a rotary axis 60. The connection holding section 21 and the sealing section 31 are formed by that a member having thin plate shape (sealing plate) is bent (folded) at the first bending section 22 and the second bending section 30 by press working, etc. The first bending section 22 and the second bending section 30 are folded that, any of them, bent ridge lines thereof are in parallel to an axial direction of the leaf seal device 1 (an axis direction of the rotary axis 60) and a bending direction becomes a circumferential direction of the leaf seal device 1 (a circumferential direction of the rotary axis 60).

In the present embodiment, the bending direction of the first bending section 22 and the second bending section 30 are opposite direction at the circumferential direction shown in drawings. Namely, as shown in FIG. 4, viewing from a cross section of edge side face direction of the sealing plate 12, the first bending section 22 and the second bending section 30 are formed so that its cross sectional shape becomes in a zigzag pattern.

The leaf seal device 1 is composed by connecting large number of the sealing plate 12 having an identical shape and composition. Connection of the sealing plate 12 is performed by laminating the connection holding section 21 of the outer circumferential side of the sealing plate 12, namely, performed by sequentially overlapping. As shown in FIG. 4, the connecting portion holding portion 21 of the sealing plate 12 is folded to a circumferential direction by the first bending section 22, a concave portion (convex portion) is formed along a radial direction as shown in the drawing. Therefore, the sequentially adjacent sealing plates 12 become mutually fitting status at the radial direction respectively by sequentially overlapping this convex portion of the connection holding section 21 with the convex portion (back face of the concave portion) of the connection holding section 21 of the adjacent sealing plate 12, and a position of the radial direction can be defined. Namely, the connection holding sections 21 of a plurality of the sealing plate 12 are overlapped by sequentially fitting, the position of the radial direction of a plurality of the sealing plate 12 is defined at a specified position. Also, the leaf seal device 10 as an assembly of the sealing plate 12 can be formed easily by sequentially overlapping them as a ring shape.

In the leaf seal 10 constituted in this manner, as shown in FIG. 4, a line "a" which connects the first binding portion 22 of the respective sealing plate 12 and a line "b" which connects the second binding portion 30 of the respective sealing plate 12 become circles which are concentric with the rotary axis 60 and the leaf seal device 1, respectively (herein after, the lines "a" and "b" are referred as "circumferential line"). Note that, when it is specified with reference to only a few part of the sealing plate 12 of the annular leaf seal 10, circles (the circumferential lines) "a" and "b" may be regarded as straight lines mostly. Also, in this case, these two circles "a" and "b" which are different diameters can be regarded as a parallel line.

Also, in case that imaging such circles (circumferential lines) "a" and "b", a shape of the sealing plate 12, namely bending shapes of the first bending section 22 and the second bending section 30 may be defined by angles θ1 and θ2 to the circumferential lines "a" and "b", as shown in the drawing. Also, a shape of the sealing section 31 may be defined by the angle θ1 to the circumferential line "b" of a face of the sealing section 31. Note that, there will be a case that the angle θ2 is called as an inclination angle, the angle θ1 is called a bend angle.

Then, in the leaf seal device 1 of the present embodiment, a space of the sealing section 31 can be controlled as a desired length by controlling a plate thickness "t" of the sealing plate 12, the bend angle θ2 and the inclination angle θ1 at the first bending section 22 and the second bending section 30 of the sealing plate 12.

Namely, as shown in FIG. 4, when an angle of a face 24 of an inner circumferential side of the connection holding section 21 with the circumferential line "a" is defined as θ2, an angle of a face f the sealing section 31 with the circumferential line "b" is defined as θ1, a plate thickness of the sealing plate 12 is defined as "t", a pitch "p" on the circumferential line "b" of the sealing section 31 is defined by a following formula (1).

$$P = t/\sin\theta2 \quad (1)$$

Also, a space "G" of the respective sealing plat 12 is defined by a following formula (2).

$$G = P \times \sin\alpha1 - t \quad (2)$$

Therefore, when the plate thickness "t" of the sealing plate 12 is constant, the pitch of the sealing section 31 and the space between the sealing sections 31 can be adjusted by the bend angle θ2 at the first binding portion 22 of the connection holding section 21 and the inclination angle θ1 of the second binding portion 30.

Specifically, for example, under a condition that the plate thickness "t" of the sealing plate 12 and the inclination θ1 of the sealing section 31 are set as an identical, as shown in FIG. 5A, when the bend angle of the first bending section 22 of the connection holding section 21 is θ2, if a pitch "Pa" and a space "Ga" are obtained, as shown in FIG. 5B, when the θ2 of the bend angle of the first binding portion 22 of the connection holding section 21 is changed to θ2b which is smaller than θ2a (θ2b<θ2a), a pitch "Pb" of the sealing section 31 becomes larger with respect to a case shown in FIG. 5A, also, a space "Ga" of the sealing section 31 becomes larger with respect to a case shown in FIG. 5A (Gb>Ga). Namely, by changing the bend angle θ2 of the first bending section 22 of the connection holding section 21, the pitch "P" and the space "G" of the sealing section 31 can be adjusted.

In this manner, in the leaf seal device 1 of the present embodiment, the sealing section 31 of the sealing plate 12 is bent to the connection holding section 21 by the second bending section 30, thereby, the sealing section 31 is equipped angularly to the outer circumferential face of the rotary axis 60 to a rotary direction of the rotary axis 60. Then, the bend angle θ1 of the sealing section 31 by the second bending section 30, and the pitch "P" of the respective sealing section 31 or the space (gap) "G" can easily be set as a desired value by adjusting the bend angle θ2 of the first bending section 22 of the connection holding section 21. Namely, it can be set as a desired value based on a rotation speed of the axis, an eccentricity dimension of the axis or a fluctuation status, etc.

Note that, although a dimension of the sealing plate 12 may be an arbitral dimension in response to a size of the an device of the applying object (in the present embodiment, specifically the casing 50 and the axis 60), as an example of the general purpose leaf seal device 1, 0.05 to 0.5 mm thickness, 20.0 to 100.0 mm length, 3.0 to 10.0 mm width. Note that, in the present embodiment, a length of the sealing plat 12 is 30.0 mm and a width is 5.0 mm. Also, a thickness of the sealing plate 12 is 0.1 mm. Also, the bend angle θ2 of the first bending section 22 of the connection holding section 21 and the inclination angle θ1 of the sealing section 30 may be set arbitrarily, as a preferable example, the inclination angle θ1 of the sealing section 31 is 30° to 80°, preferably 40° to 78°.

In the above mentioned leaf seal 10 of the first embodiment, a space is occurred between the sealing sections 31, if the bend angle θ2 of the first bending section 22 of the connection holding section 21 is smaller with respect to the inclination angle 81 of the sealing section 31. For example, incase that the bend angle θ1 of the sealing section 31 is more than 45°, a space is occurred when the bend angle θ2 of the first bending section 22 of the connection holding section 21 is less than 45°. However, there is a case of seeking the inclination angle θ1 is less than 45° or further large spaces between the sealing sections 31 are necessary. With respect to a leaf seal device preferable to use for the case, it will be specified as a second embodiment with reference to FIG. 6, FIG. 7A and FIG. 7B.

Figure 6:
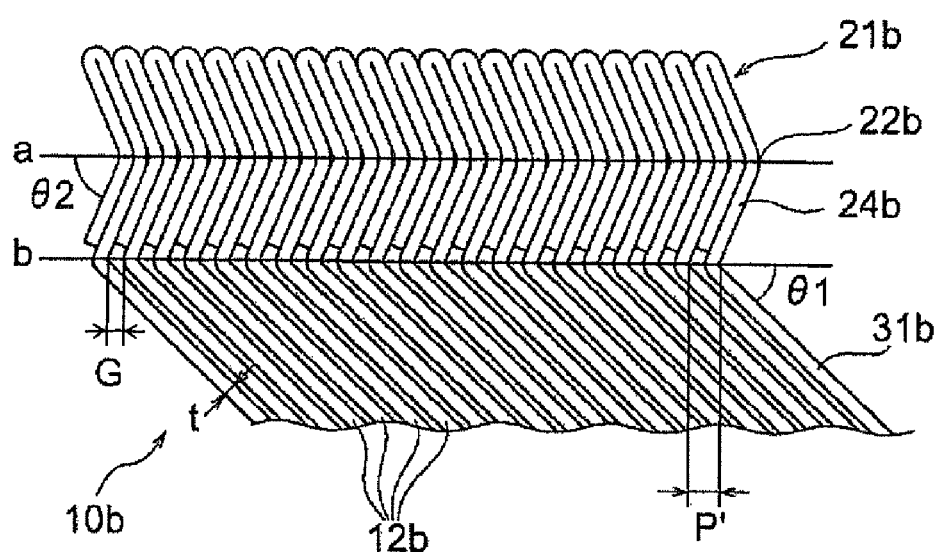
FIG. 6 shows a constitution of a sealing plate as a second embodiment of the present invention.

FIG. 6 is a drawing to show constitutions of a leaf seal 10b and a sealing plate 12b. In the leaf seal 10b shown in FIG. 6, an end portion of an outer circumferential side of the sealing plate 12b is bent, and a connection holding section 21b is constituted as a double sealing plate 12b.

In the leaf seal 10b having constitution shown in FIG. 6, it can be considered that a plate thickness of the connection holding section 21b becomes two times. Therefore, as similar with shown in FIG. 4, when an angle of a face 24b of an inner circumferential side of the connection holding section 21b with a circumferential line "a" is defined as θ2, an angle of a face 31 of the sealing section 31 with a circumferential line "b" is defined as θ1, a plate thickness of the sealing plate 12b is defined as "t", a pitch "p'" on the circumferential line "b" of the sealing section 31 is defined by a following formula (3).

$$P' = \frac{2xt}{\sin\theta2} \quad (3)$$
$$= 2xP$$

Namely, the pitch "P'" of the sealing section 31 becomes two times compared from the pitch "P" of the leaf seal 10 wherein the sealing plate 21 is not bent at the connection holding section 21 shown in the first embodiment. Then, the space "G'" of the sealing section 31 of the leaf seal 10 is defined by a following formula (4), and the space "G'" becomes more than two times as compared from the space "G" of the leaf seal 10 wherein the sealing plate 12 is not bent at the connection holding section 21 shown in the first embodiment.

$$G' = P' x \sin\theta1 - t \quad (4)$$
$$= 2xP \times \sin\theta1 - t$$
$$= 2G + t$$

Therefore, there is a case of seeking the bend angle θ1 is less than 45° or further large spaces between the sealing sections 31 are necessary, the connection holding section 21b may be constituted so that the sealing plate 12b is bent as a double sealing plate 12b.

Then, in the leaf seal 10b having such constitution, the pitch "P'" of the sealing section 31b and the space "G'" between the sealing sections 31b can be adjusted by the bend angle θ2 at the first binding portion 22b of the connection holding section 22b and the inclination angle θ1 of the second binding portion 30b.

Figure 7A:
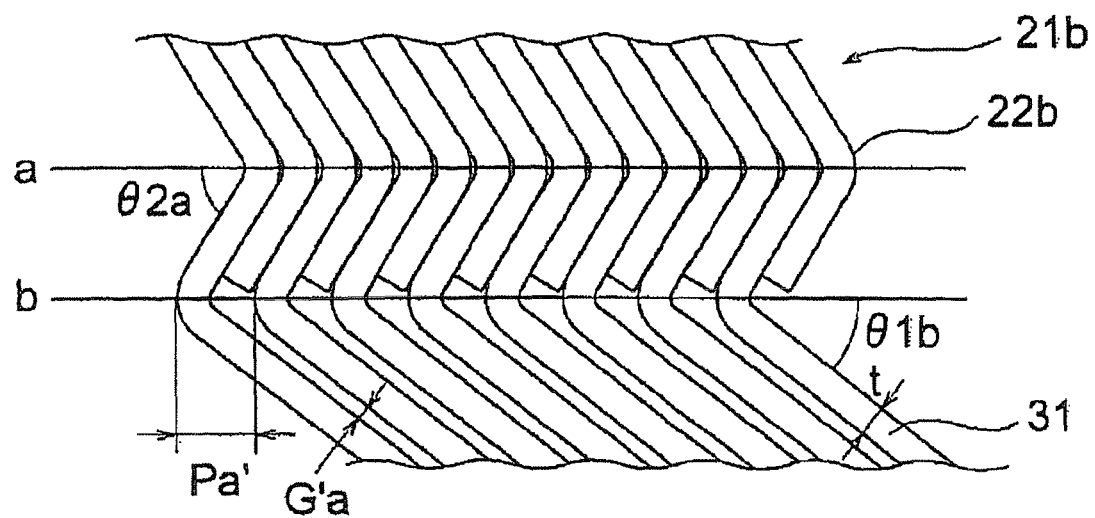
FIG. 7A shows a changing condition of a pitch and a space of the sealing section in response to a bend angle of the first bending section in the leaf seal device shown in FIG. 6, in case of the binding angle of the first bending section is relatively large.
Figure 7B:
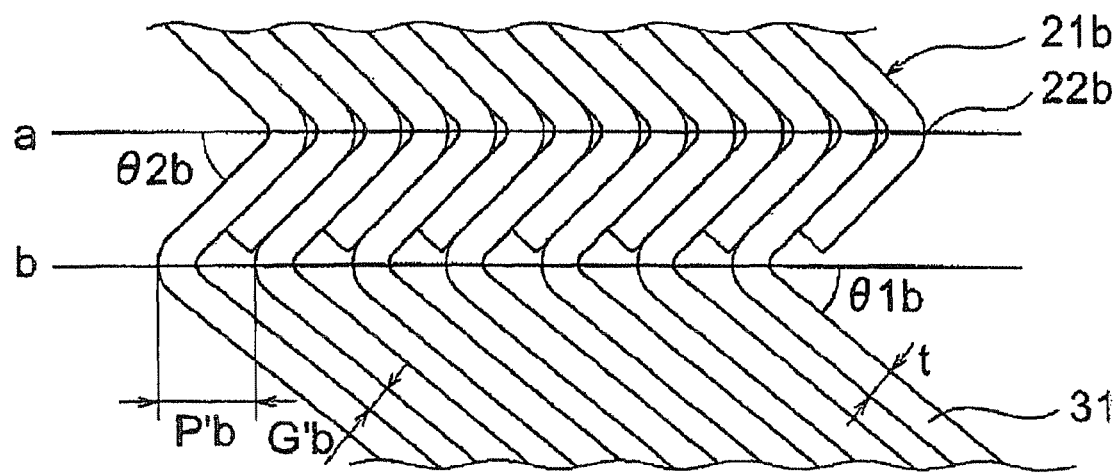
FIG. 7B shows a changing condition of a pitch and a space of the sealing section in response to a bend angle of the first bending section in the leaf seal device shown in FIG. 6, in case of the binding angle of the first bending section is relatively small.

Specifically, as shown in FIG. 7A, for example, in case that the first bending section 22b of the connection holding section 21b is constituted as the pitch "P'a" and the gap "G'a" when the bend angle θ2a, if the bend angle θ2 of the first binding portion 22 of the connection holding section 21 is smaller than θ2a (θ2b<θ2a), as shown in FIG. 7B, the pitch "P'b" of the sealing section 31 becomes larger than the pitch "P'a" (P'b>P'a) in case of shown in FIG. 7A, also, the space "G'b" of the sealing section 31b becomes larger than the space "G'a" shown in FIG. 7A (G'b>G'a). Namely, in this manner, the pitch "P'" of the sealing section 31 and the space "G'" of the sealing section 31b can be adjusted by changing the bend angle θ2 of the first bending section 22b of the connection holding section 21b.

In the leaf seal 10b of such constitution, the first holding portion 22b is formed at the connection holding section 21b, the leaf seal 10b as an assembly of the sealing plate 12 can be formed easily by sequentially fitting and overlapping the connection holding section 21b of a plurality of the sealing plate 12b.

The first bending sections 22, 22b are formed at the connection holding sections 21, 21b in either the leaf seals 10, 10b of the first embodiment and the second embodiment, the leaf seals 10, 10b could be formed easily by fitting and overlapping the bending sections 22, 22b. However, an aim of the present invention exists that the pitch "p" and the space "G" of the respective sealing plates 12, 12b of the sealing section 10, 10b can be adjusted easily by forming the connection holding sections 21, 21b (inner circumferential side faces 24, 24b) which connect with the sealing section 31, 31b on a face which is angled to an alignment direction of the sealing plate and adjusting the angle of the face. Therefore, it is available to constitute the bending portion 22, 22b are not formed at the connection holding sections 21, 21b. With respect to a leaf seal having such constitution, it will be specified with reference to FIG. 8A, FIG. 8B, FIG. 9A and FIG. 9B as a third embodiment and a fourth embodiment.

Figure 8A:
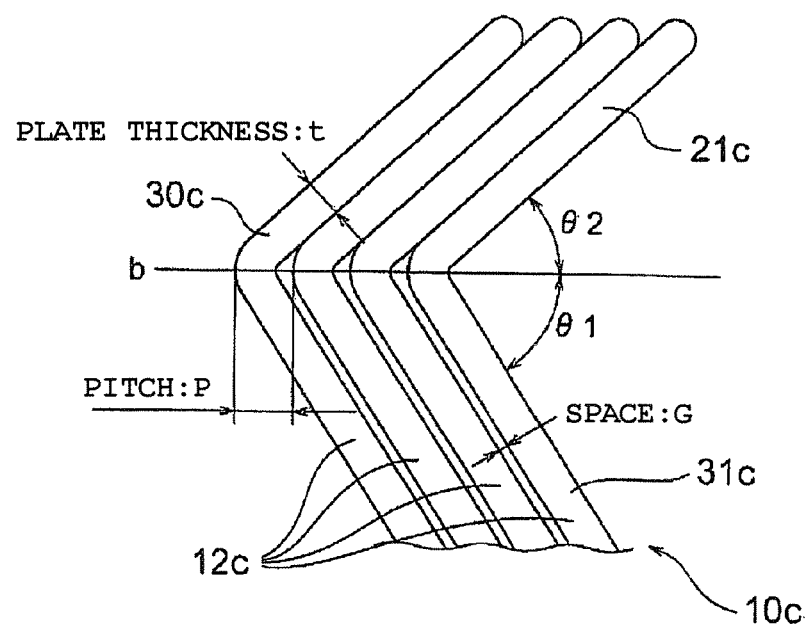
FIG. 8A is a first drawing shows a sealing plate in which a folding portion is not formed at a communication holding section as a third embodiment of the present invention, and shows a vicinity of an end portion of the connection holding section side of the sealing plate.

FIG. 8A is a drawing to show a constitution of a leaf seal 10c as a third embodiment and to show a vicinity of end portion of a connection holding section 21c side. As shown in FIG. 8A, respective sealing plates 12c of a leaf seal 10c comprise a connection holding section 21c and sealing section 31c, at a boundary section thereof a bending section 30c is formed. The sealing plate 12c is formed that a thin plate shape member is bent as a desired angle at the bending section 30c for example, by press working, etc. As it is clear from referring FIG. 4, a different point from the above mentioned sealing plate 12 of the first embodiment is that the bending section 22 is not formed at a connection holding section 21c. Namely, the connection holding section 21c of the present embodiment may be said as a constitution wherein an inner circumferential side angular face 24 of the connection holding section 21 of the sealing plate 12 of the first embodiment only is included.

In the leaf seal 10c of the present embodiment, the sealing plate 12c is that connection holding sections 21c of a plurality of the sealing plate 12c is angularly multilayered to a circumferential "b" of the leaf seal 10c as shown in a drawing, and as similar with the sealing section 10 of the first embodiment, the holding portion 21c is sandwiched between the backing plate 41 and the holding plate 45 (refer to FIG. 1) so as to be formed at the leaf seal 10 which is ring shape.

Also, in the leaf seal 10c having such constitution, a pitch "P" and a space "G" of the sealing section 31c can be controlled as a desired length by controlling a plate thickness "t", a inclination angel θ2 of the connection holding section 21c to the circumferential "b" at a bending section 30c and a inclination angle θ1 of the sealing section 30c. Namely, the pitch "P" of the circumferential "b" of the sealing section 31c is defined by the above mentioned formula (1), and the space "G" between the sealing plates 12c is defined by the above mentioned formula (2).

As a result, when the plate thickness "t" of the sealing plate 12c is constant, the pitch of the sealing section 31c and the space between the sealing sections 31 can be adjusted by the inclination angle θ2 of the connection holding section 21c at the bending section 30c and the inclination angle θ1 of the sealing section 31c.

The leaf seal 10c of the third embodiment having such constitution is similar with the above mentioned first embodiment and the second embodiment at a point that the pitch of the sealing section 31c and the space between the sealing sections 31c can be adjusted easily by changing the plate thickness "t" of the sealing plate 12c or the bend angle of the connection holding section 21c and the sealing section 31c. Although it can be considered that the leaf seal 10 of the first embodiment has an advantageous with respect to easiness when laminating and arranging large number of the sealing plate 12c, the leaf seal 10c, in turn, can be simplified constitution. In the leaf seal 10 of the first embodiment, it is necessary to bend the sealing plate 12 at two positions by press working, etc., the leaf seal 10c of the present embodiment can be bent at one position only. Therefore, the leaf seal of the present embodiment is available to simplify its constitution and manufacturing process at this point.

Figure 8B:
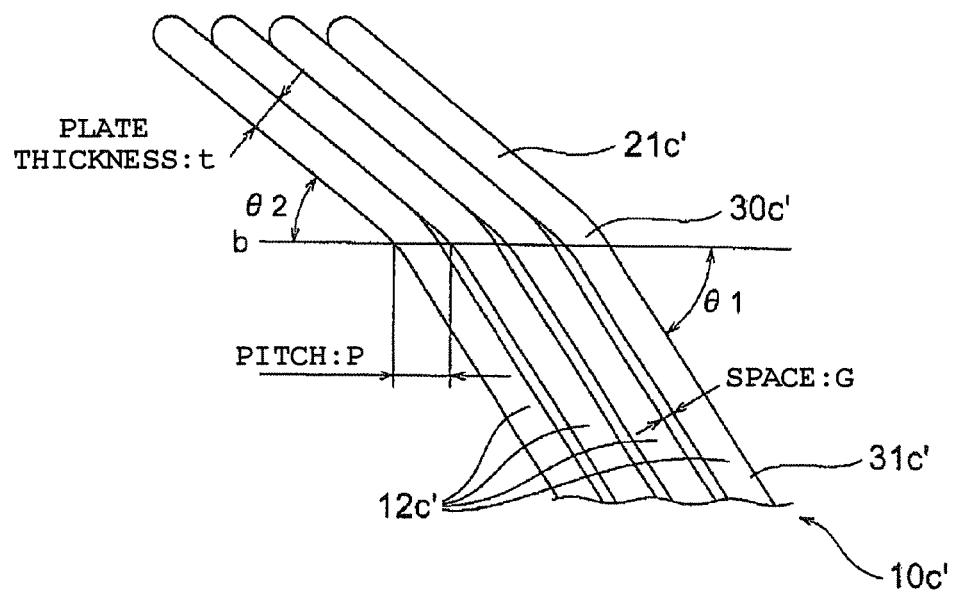
FIG. 8B is a second drawing shows a sealing plate, as similar with FIG. 8A, in which a bending section is not formed at a communication holding section as the third embodiment of the present invention, and shows a vicinity of the end portion of the communication holding section side of the sealing plate.

A leaf seal 10c' shown in FIG. 8B is that, as similar with the leaf seal 10c shown in FIG. 8A, a leaf seal having constitution wherein a bending section (22 (refer to FIG. 1, etc.)) is not formed at a connection holding section 21c'. The leaf seal 10c' shown in FIG. 8B is different from the leaf seal 10c shown in FIG. 8A at a inclination angle of the connection holding section 21c to a circumferential "b", in other words, a bend angle (an angle between the connection holding section 21c' and the sealing section 31c') at the holding portion 30c' and a multilayer shape (multilayer position) of the sealing plate 12c' are different from the leaf seal 10c shown in FIG. 8A. The leaf seal 10c shown in FIG. BA is that a direction which becomes a sharp angle of an angle between the connection holding section 21c and the circumferential "b" (θ2) and a direction which becomes a sharp angle between the sealing section 31c and the circumferential "b" (θ1) are identical directions on the circumferential "b". However, the leaf seal 10c' shown in FIG. 88 is that a direction which becomes a sharp angle of an angle (θ2) between the connection holding section 21c' and the circumferential "b" and an angle which becomes a sharp angle between the sealing section 31c' and the circumferential "b" (θ1) are opposite directions on the circumferential "b".

In the leaf seal 10c' having such constitution, the pitch "P" on the circumferential "b" of the sealing section 31c' is determined according to the above mentioned formula (1) by defining the inclination angle θ2 of the connection holding section 21c to the circumferential "b" of the leaf seal 10c' as shown in drawings, and a space between the sealing plates 12c' is determined by the above mentioned formula (1). Therefore, as similar with the above mentioned leaf seals of the respective embodiments, the pitch of the sealing section 31c' and the space between the sealing section 31c' can be adjusted easily by changing the plate thickness "t" of the sealing plate 12c' or the bend angle of the connection holding section 21c' and the sealing section 31c'. Also, as similar with the leaf seal 10c shown in FIG. 8A, it is available to simplify a constitution and manufacturing process.

Figure 9A:
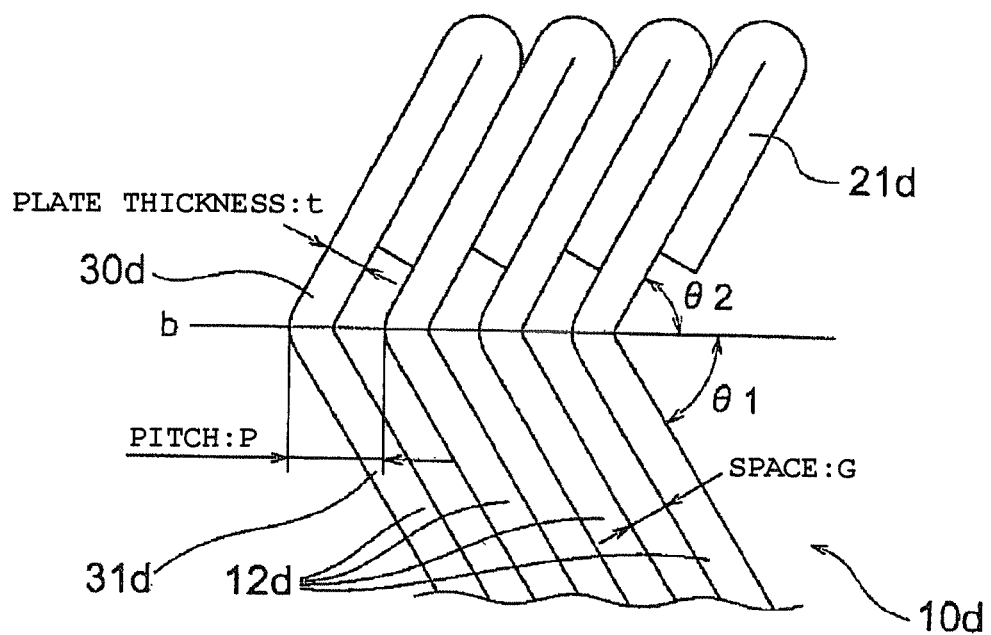
FIG. 9A is a first drawing shows a sealing plate in which a bending section is not formed at a communication holding section and an end portion of an end of outer circumferential side is bent as a fourth embodiment of the present invention, and shows a vicinity of an end portion of the communication holding section side of the sealing plate.

That is, a shape of the connection holding section 21 may be defined by the angle θ2 to the circumferential line "a" of each of an outer circumferential side face 23 and an inner circumferential side face 24 of the connection holding section 21 forming the first bending section 22. Also, FIG. 9A is a drawing to show a constitution of a leaf seal 10d as a fourth embodiment of the present invention and to show a vicinity of end portion of a connection holding section 21d side. The leaf seal 10d shown in FIG. 9A is a constitution that, as similar with the leaf seals 10c, 10c' specified with reference to FIG. 8A and FIG. 88, a bending section is not formed at a connection holding section 21d, a bending section 30d is formed at only one position of a boundary between the connection holding section 21d and the sealing section 31d. And in the leaf seal 10d of the present embodiment, the sealing plate 12d is folded at an end portion thereof, and the connection holding section 21d is constituted as a double sealing plate 12d.

In a constitution wherein a bending section is not formed at the connection holding section 21d, a plate thickness can be constituted as two times by folding the sealing plate 12d at the connection holding section 21d as in this manner. In this case, a pitch "P'" on a circumferential "b" of the sealing section 31d is defined by the above mentioned formula (3), a space "G'" between the sealing plates 12d is defined by the above mentioned formula (4), and as similar with the above mentioned leaf seal 10b (refer to FIG. 6, FIG. 7A and FIG. 73), the pitch "P'" becomes two times as compared from the pitch "P" which is not folding the sealing plate 12b at the connection holding section 21d, the space "G'" between the sealing section 31d becomes two times or more when comparing from the space "G" in which the sealing plate 12d is not folded at the connection holding section 21d.

In this manner, in the leaf seal 10d shown in FIG. 9A, the pitch of the sealing section 31d and the space between the sealing section 31d can be adjusted easily by changing the plate thickness "t" or the bend angle of the connection bending section 21d and the sealing section 31d. Then, particularly in the leaf seal 10d of the fourth embodiment, in case of seeking the inclination angle θ1 of the sealing section 31d is less than 45°, or in case that further large spaces between the sealing sections 31d are necessary, the sealing plate 12d may be used to the connection holding section 21d by folding the sealing plate 12d as double which is preferable.

Then, as similar with the leaf seals 10c, 10c' of the third embodiment, a constitution can be simplified because a bending section is not formed at the connection holding section 21d. Also, in the leaf seal 10b of the second embodiment, it is necessary to bend the sealing plate 12b at two positions by press working, etc., however, in the leaf seal 10d of the present embodiment, it may be bend at one position only. Therefore, a constitution and manufacturing process of the leaf seal of the present embodiment can be simplified at this point.

Figure 9B:
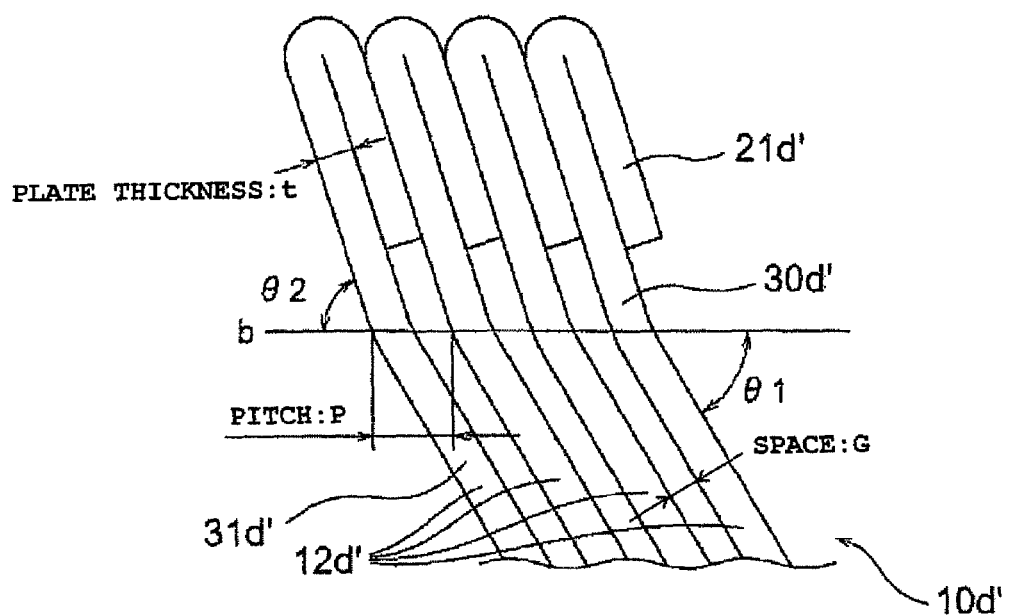
FIG. 9B is a second drawing shows the sealing plate in which a folding portion is not formed at a communication holding section and an end portion of an end of outer circumferential side is bent as a fourth embodiment of the present invention, and shows a vicinity of an end portion of the communication holding section side of the sealing plate.

Also, the leaf seal 10d' shown in FIG. 9B is that, as similar with the leaf seal 10d shown in FIG. 9A, although a bending section (22 (refer to FIG. 1, etc.)) is not formed at the connection holding section 21d', a thin plate is folded at an end portion of an outer circumferential side of the sealing plate 12d', the connection holding section 21d' is a leaf seal wherein the sealing plate 12d' is constituted as a double. Then, the leaf seal 10d' shown in FIG. 9B is different from the leaf seal 10d shown in FIG. 9A at a inclination angle of the connection holding section 21d' to a circumferential "b", in other words, a bend angle (an angle between the connection holding section 21d' and the sealing section 31d') at the holding portion 30d' and a multilayer shape (multilayer position of the sealing plate 12d' are different from the leaf seal 10d shown in FIG. 9A. The leaf seal 10d shown in FIG. 9A is that a direction which becomes a sharp angle of an angle between the connection holding section 21d and the circumferential "b" (θ2) and a direction which becomes a sharp angle between the sealing section 31d and the circumferential "b" (θ1) are identical directions on the circumferential "b". However, the leaf seal 10d' shown in FIG. 9B is that a direction which becomes a sharp angle of an angle (θ2) between the connection holding section 21d' and the circumferential "b" and an angle which becomes a sharp angle between the sealing section 31d' and the circumferential "b" (θ1) are opposite directions on the circumferential "b".

In the leaf seal 10d' having such constitution, the pitch "P" on the circumferential "b" of the sealing section 31d' is determined according to the above mentioned formula (3) by defining the inclination angle θ2 of the connection holding section 21c to the circumferential "b" of the leaf seal 10d' as shown in the drawing, and a space "G" between the sealing plates 12d' is determined by the above mentioned formula (4). Therefore, as similar with the above mentioned leaf seals of the respective embodiments, the pitch of the sealing section 31d' and the space between the sealing section 31d' can be adjusted easily by changing the plate thickness "t" of the sealing plate 12d' or the bend angle of the connection holding section 21c' and the sealing section 31d'. Also, as similar with the leaf seal 10d shown in FIG. 9A, it is available to simplify a constitution and manufacturing process.

Note that, the above mentioned embodiments are described for easily understanding the present invention, and the present invention is not limited at all. Respective elements disclosed in the present embodiment include whole design around and equivalent matters belonging into a technical scope of the present invention, and any arbitrary preferable various modifications are available.

For example, in the above mentioned first and second embodiments, any of bending directions of the first bending sections (22, 22b) and the second bending sections (30, 30b) of the respective sealing plates (12, 12b) of the leaf seals (10, 10b) are opposite at the circumferential direction, as shown in FIGS. 2, 4, 6, etc. However, the bending directions of the first bending sections (22, 22b) and the second bending sections (30, 30b) may be same directions.

Figure 10:
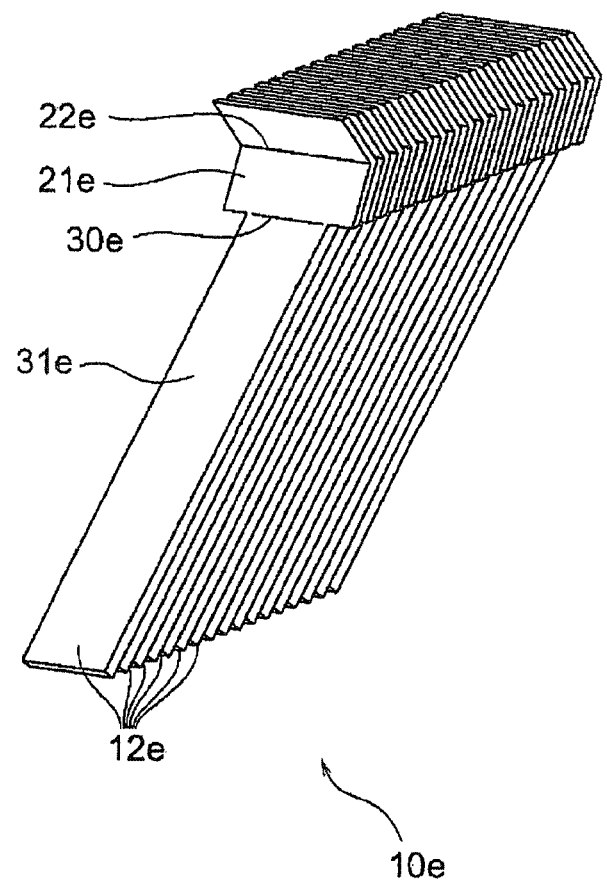
FIG. 10 shows a constitution of a leaf seal device as a further embodiment of the present invention.
Figure 11:
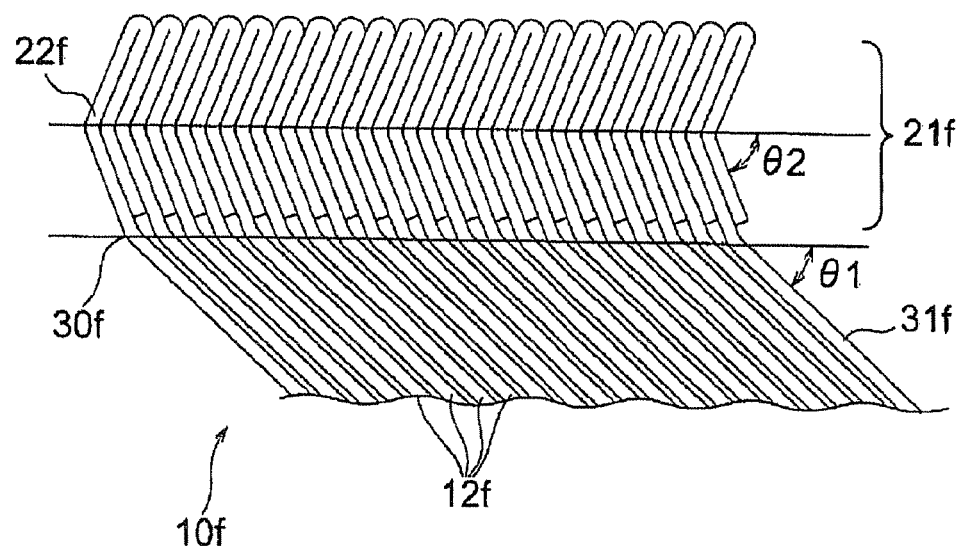
FIG. 11 shows a constitution of a leaf seal device as further another embodiment of the present invention.

A leaf seals 10e and 10f are shown in FIG. 10 and FIG. 11 wherein a bending at the first bending section of the connection holding section and a bending at the second bending section of the sealing section are same direction of the circumferential direction. FIG. 10 is a drawing to show the leaf seal 10e wherein a connection holding section 21e is constituted by a single plate of a sealing plate, FIG. 11 is a drawing to show a leaf seal 10f wherein a connection holding section 21f is constituted as double by bending a sealing plate 12f. In configurations shown in FIG. 10 and FIG. 11, a first bending sections 22e, 22f are formed, by sequentially fitting and overlapping connection holding sections 21e, 21f of pluralities of sealing plates 12e,f, the leaf seals 10e, 10e as assemblies of the sealing plates 12e, 12f can be formed easily. Also, spaces of sealing sections 31e, 31f can be controlled as a desired length by controlling bend angle θ2 of the first bending sections 22e, 22f of the connection holding sections 21e, 21f and inclination angles θ1 of the sealing sections 31e, 31f.

Also, the leaf seal device 1 of the above mentioned embodiments (for example, the first embodiment) has a constitution wherein the leaf seal 2 is sandwiched between the holding plate portion 10 and the back plate portion 16, however, the leaf seal 2 only may be provided at the mounting portion of the casing 50 without providing the holding plate portion 10 and the back plate portion 16.

The present invention can be applied to arbitral device to seal a gap between two components which relatively move around a rotary axis of an air craft engine, gas turbine, etc.

The invention claimed is:

1. A leaf seal device, comprises a leaf seal having a plurality of sealing plates of thin plate shape including a connection holding section of an outer circumferential side and a sealing section of an inner circumferential side, the connection holding sections being connected to overlap the sealing plates and to form an annular shape to which a rotary axis is available to fit at a center thereof, wherein said respective sealing plates are bent at a boundary between said connection holding section and said sealing section so that said connection holding section and said sealing section are crossed at an angle $\theta_1+\theta_2$, where a circumferential line passes through the boundary between the connection holding section and the sealing section, said connection holding section of said respective sealing plates are connected by sequentially overlapping said sealing plates at an acute angle $\theta_2$ measured with respect to a tangent of the circumferential line at the point of intersection of a sealing plate of the connection holding section and the boundary between the connection holding section and the sealing section of said leaf seal, said sealing section of said respective sealing plates are provided so as to incline at an acute angle $\theta_1$ measured with respect to the tangent of the circumferential line at the point of intersection of a sealing plate of the sealing section and the boundary between the connection holding section and the sealing section of said leaf seal, said connection holding section and said sealing section of said respective sealing plates are formed as a flat portion without any bending portion, and each of the sealing plates outside of the connection holding section of said respective sealing plates is folded at an end portion thereof to form a connection holding section having a portion in which the sealing plates are folded over upon themselves, and each space between the sealing plates at said sealing sections is set up as a desired length based on a following formula:

$$G = 2 \times P \times \sin\theta_1 - t$$

wherein

G is the space between the respective sealing plates at the sealing sections;

P is a pitch of the sealing plates, where the pitch is defined by $P = t/\sin\theta_2$; and t is a plate thickness of the sealing plate.

* * * * *